3,631,178
2-OXOINDOLINES
Kenneth G. Holden, Haddonfield, N.J., assignor to Smith Kline & French Laboratories, Philadelphia, Pa.
No Drawing. Original application Apr. 18, 1967, Ser. No. 631,619, now Patent No. 3,519,592, dated July 7, 1970. Divided and this application Apr. 21, 1970, Ser. No. 30,580
Int. Cl. C07d 27/40
U.S. Cl. 260—325         4 Claims

ABSTRACT OF THE DISCLOSURE 3-phenacylidene - 2 - oxoindoline - 7 - carboxylic acids and esters, prepared by converting 2,3-dioxoindoline-7-carboxylic acids to 3-hydroxy-3-phenacyl-2-oxo compounds and subsequent dehydration. The 3-phenacylidene compounds are reduced to the 3-phenacyl compounds and then ring-closed with hydrazine to give 3-pehnylpyridazinoindoles, 2-oxoindoline-7-carboxylic acids are prepared by stepwise reduction of the 2-3-dioxo compounds. Certain of the compounds have antiinflammatory activity.

---

This application is a division of copending application Ser. No. 631,619, filed Apr. 18, 1967, now U.S. Pat. No. 3,519,592.

This invention relates to heterocyclic compounds having utility as antiinflammatory agents or as intermediates therefor. In particular, the invention relates to indolecarboxylic acid and pyridazinoindolecarboxylic acid compounds.

One group of compounds within the scope of the invention is represented by the following formula:

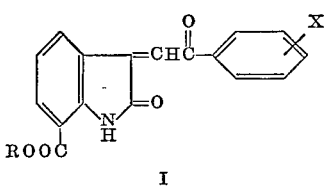

I wherein R is hydrogen or lower alkyl, and X is hydrogen, lower alkyl, lower alkoxy, chloro, bromo, fluoro, or trifluoromethyl.

A second group of compounds within the scope of the invention is represented by structural Formula II.

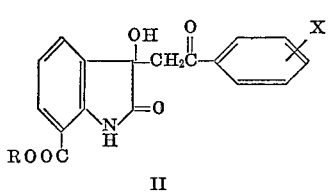

II wherein R and X are as defined above.

A third group of compounds within the scope of the invention is represented by structural Formula III.

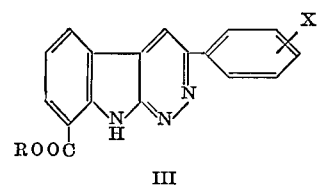

III wherein R and X are as defined above.

A fourth group of compounds within the scope of the invention is represented by structural Formula IV.

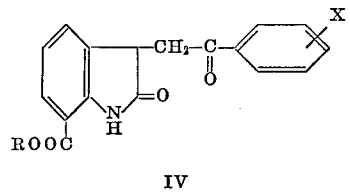

IV wherein R and X are as defined above.

A fifth group of compounds within the scope of the invention is represented by structural Formula V.

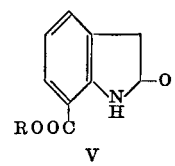

V wherein R is as defined above.

A final group of compounds within the scope of the invention is represented by structural Formula VI.

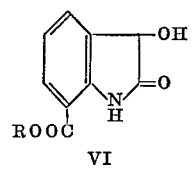

VI wherein R is as defined above.

The terms "lower alkyl" or "lower alkoxy" for purposes of this invention are intended to represent those alkyl and alkoxy groups having up to about 4 carbon atoms.

Also within the scope of the invention are the pharmaceutically acceptable acid addition salts of the compounds of Formula III. Such salts include the hydrochloride, sulfate, hydrobromide, nitrate, acetate, maleate, and tartrate.

The compounds of the invention are prepared by methods described hereinbelow according to the sequence illustrated in the following chart.

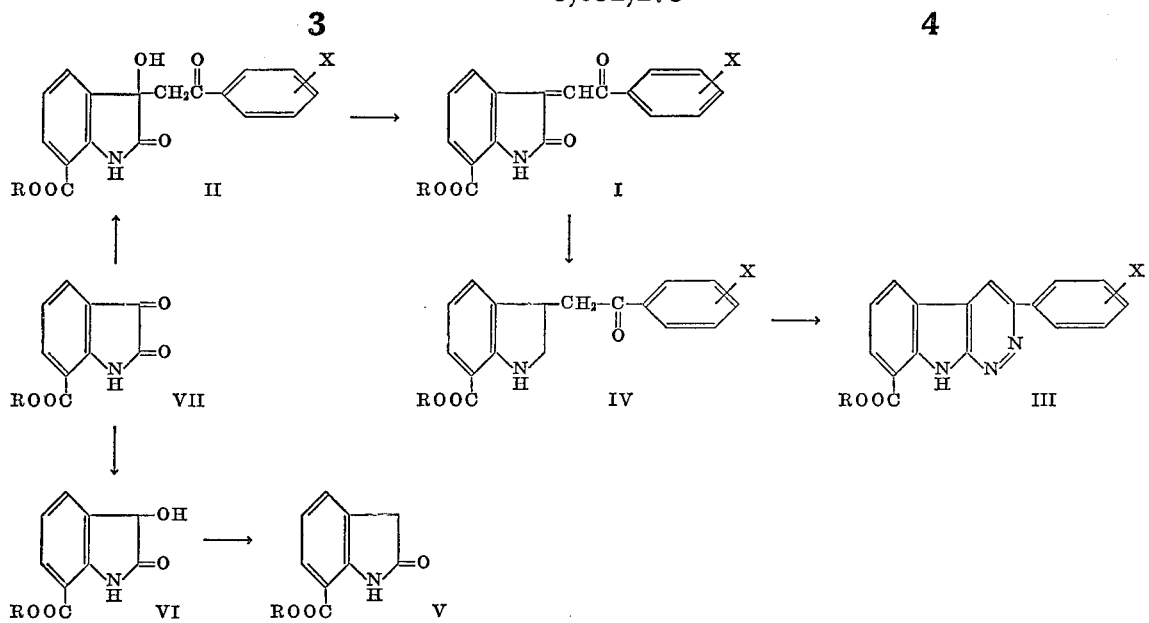

The 3-hydroxy-3-phenacyl-2-oxo-7-indolinecarboxylic acids and esters of Formula II are prepared by condensing the corresponding isatincarboxylic acid or ester VII with the appropriate acetophenone in the presence of a base such as diethylamine. The reaction is preferably conducted in refluxing alcohol. The phenacylidene compounds of Formula I are prepared by dehydrating the phenacyl compounds of Formula II using glacial acetic acid containing a small amount of hydrochloric acid on the steam bath. The phenacyl compounds of Formula IV are obtained by reduction of the phenacylidene compounds of Formula I with sodium hydrosulfite in aqueous alcohol. The 3-phenyl-9H-pyridazino[3,4-b]indoles of Formula III are prepared by treating the phenacyl compounds IV with hydrazine in the presence of oxygen and an acid such as acetic acid. The 3-hydroxy-2-oxo compounds of Formula VI are prepared by reducing the 3-oxo group of the starting isatin compounds VII with sodium hydrosulfite. Reduction of this 3-hydroxy group to give the 2-oxo compounds of Formula V is accomplished with sodium and lead.

The carboxylic acid compounds (R=H) are prepared either by using a carboxylic acid as starting material or by hydrolyzing an ester. The esters in turn may be prepared either by using the corresponding esters as starting material or by esterifying a carboxylic acid product.

The compounds of Formulas I, III, and V possess antiinflammatory activity. Among the preferred compounds are 3-(p-fluorophenacylidene)-2-oxoindoline-7-carboxylic acid, 3-(m-fluorophenacylidene)-2-oxoindoline-7-carboxylic acid, 3-(m-trifluoromethyl-phenacylidene)-2-oxoindoline-7-carboxylic acid, 3-phenyl-9H-pyridazino[3,4-b]indole-8-carboxylic acid, and 2-oxindoline-7-carboxylic acid, which possess antiinflammatory activity in rats when administered orally and subcutaneously in doses of 40–50 mg./kg.

These compounds are formulated for use in inflammatory conditions by combining them either in the form of the free bases or zwitterions, their pharmaceutically acceptable acid addition salts, when such exist, or their alkali metal or amine salts with standard pharmaceutical excipients according to conventional practice in order to prepare tablets, capsules, injectables, and ointments.

The compounds of Formulas II, IV, and VI are useful as intermediates for preparing the antiinflammatory agents. The 3-hydroxy-3-phenacyl compounds of Formula II are useful for preparing both the 3-phenacylidene compounds of Formula I and the pyridazinoindole compounds of Formula III, while the 3-phenacyl compounds of Formula IV are useful for preparing the pyridazinoindole compounds. The 3-hydroxy-2-oxoindolines of Formula VI are useful for preparing the 2-oxoindolines of Formula V.

The following examples are intended to illustrate the preparation of the compounds of the invention, but are not to be construed as limiting the scope thereof. Temperatures stated are in degrees centigrade.

EXAMPLE 1

3-hydroxy-3-phenacyl-2-oxoindoline-7-carboxylic acid methyl ester

A suspension of 5.0 g. (26 mmoles) of methyl 2,3-dioxoindoline-7-carboxylate in 100 ml. of boiling ethanol is treated with 3.7 g. (31 mmoles) of acetophenone and 15 drops of diethylamine. Boiling is continued for 1 hour after complete solution is achieved and the solution is then allowed to stand overnight. The mixture is cooled and the resulting precipitate filtered off and washed with ether to give the title product, M.P. 157–160°. A second crop is obtainable from the mother liquor. The compound is recrystallized from ethanol and melts at 158–160°.

EXAMPLE 2

3-hydroxy-3-phenacyl-2-oxoindoline-7-carboxylic acid

To a boiling suspension of 2 g. (11.15 mmoles) of 2,3-dioxoindoline-7-carboxylic acid in 60 ml. of ethanol is added 1.5 g. (12.5 mmoles) of acetophenone and 1.3 ml. (0.92 g., 12.7 mmoles) of diethylamine. The solution is allowed to stand overnight, concentrated to about one-half volume, cooled, and filtered. The dried precipitate of the diethylamine salt of the product is recrystallized from methanol-ethyl acetate and melts at 183° dec.

EXAMPLE 3

3-hydroxy-3-(m-fluorophenacyl)-2-oxoindoline-7-carboxylic acid

A mixture of 5.72 g. (30 mmoles) of 2,3-dioxoindoline-7-carboxylic acid, 3.6 ml. (2.55 g., 35 mmoles) of diethylamine, and 4.14 g. (30 mmoles) of m-fluoroacetophenone in 100 ml. of absolute ethanol is heated until solution is complete and then allowed to stand overnight. The mixture is then cooled and filtered to give the title product, M.P. 158–160° dec.

EXAMPLE 4

3-hydroxy-3-(p-fluorophenacyl)-2-oxoindoline-7-carboxylic acid

Use of p-fluoroacetophenone in the procedure of Example 3 instead of m-fluoroacetophenone results in the formation of the title product, M.P. 173–177° dec.

EXAMPLE 5

3-hydroxy-3-(m-trifluoromethylphenacyl)-2-oxoindoline-7-carboxylic acid

Use of 5.64 g. (30 mmoles) of m-trifluoromethylacetophenone in the procedure of Example 3 instead of m-fluoroacetophenone results in the formation of the title product, M.P. 103–106°. The product is isolated by evaporating the ethanol, dissolving the residue in hot ethyl acetate, treating with charcoal, filtering, and allowing the product to crystallize from the filtrate.

EXAMPLE 6

3-phenacylidene-2-oxoindoline-7-carboxylic acid methyl ester

A suspension of 6.8 g. (22 mmoles) of 3-hydroxy-3-phenacyl-2-oxoindoline-7-carboxylic acid methyl ester in 35 ml. of glacial acetic caid containing 1 ml. of conc. HCl is heated on the steam bath. After a few minutes solution is complete. Upon continued heating a precipitate forms, the mixture is diluted with 35 ml. of 95% ethanol, cooled and filtered. The recovered precipitate of the title product is recrystallized from ethanol; 192–193°.

EXAMPLE 7

3-phenacylidene-2-oxoindoline-7-carboxylic acid

A suspension of 5.48 g. (13.6 mmoles) of 3-hydroxy-3-phenacyl-2-oxoindoline-7-carboxylic acid in 50 ml. of glacial acetic acid containing 3 ml. (36 mmoles) of conc. HCl is heated on the steam bath with stirring. After 30 minutes, the thick mixture is diluted with alcohol and water, and filtered. Recrystallization from ethanol-water gives the title product, M.P. 253–256° dec.

EXAMPLE 8

3-(m-fluorophenacylidene)-2-oxoindoline-7-carboxylic acid

A suspension of 7.7 g. (19.2 mmoles) of 3-hydroxy-3-(m-fluorophenacyl-2-oxoindoline-7-carboxylic acid in 100 ml. of glacial acetic acid is treated with 10 ml. of conc. HCl and heated to boiling with stirring. When the reaction has been indicated by thin layer chromatography to be complete, the mixture is diluted to 200 ml. with water and ethanol, cooled, and filtered. Recrystallization of the recovered precipitate from ethanol-ethyl acetate gives the title product, M.P. 253–255°.

EXAMPLE 9

3-(p-fluorophenacylidene)-2-oxoindoline-7-carboxylic acid

Use of 8.7 g. (21.6 mmoles) of 3-hydroxy-3-(p-fluorophenacyl)-2-oxoindoline-7-carboxylic acid in the procedure of Example 8 instead of the m-fluoro compound results in the formation of the title product, recrystallized from ethanol-ethyl acetate; M.P. 263–268°.

EXAMPLE 10

3 - (m - trifluoromethylphenacylidene) - 2-oxoindoline-7-carboxylic acid

Use of 7.1 g. (15.7 mmoles) of 3-hydroxy-3-(m-trifluoromethylphenacyl)-2-oxoindoline-7-carboxylic acid in the procedure of Example 8 instead of the m-fluorophenacyl compound results in the formation of the title product, recrystallized from ethyl acetate; M.P. 235–237°.

EXAMPLE 11

3-phenacyl-2-oxoindoline-7-carboxylic acid

A suspension of 11.2 g. (38.2 mmoles) of 3-phenacylidene-2-oxoindoline-7-carboxylic acid in 150 ml. of alcohol is heated with stirring and treated with 15 g. of $Na_2S_2O_4$ in 50 ml. of water. Heating is continued until most of the color is dissipated and the mixture is then allowed to stir on a warm hot plate for 45 minutes. The mixture is diluted with water, seeded, and allowed to stand overnight in the refrigerator. The resulting precipitate is filtered off, dried, and recrystallized from ethanol-water to give the title product, M.P. 243–246°.

EXAMPLE 12

Use of 3 - phenacylidene - 2-oxoindoline-7-carboxylic acid methyl ester, 3-(m-fluorophenacylidene)-2-oxoindoline-7-carboxylic acid, 3-(p-fluorophenacylidene)-2- oxoindoline-7- carboxylic acid, or 3-(m-trifluoromethylphenacylidene)-2-oxoindoline-7-carboxylic acid as starting material in the procedure of Example 11 results in the formation of 3-phenacyl-2-oxoindoline-7-carboxylic acid methyl ester, 3-(m-fluorophenacyl)-2-oxoindoline-7-carboxylic acid, 3-(p-fluorophenacyl)-2-oxoindoline-7-carboxylic acid, or 3-(m-trifluoromethylphenacyl)-2-oxoindoline-7-carboxylic acid, respectively.

EXAMPLE 13

3-phenyl-9H-pyridazino[3,4-b]indole-8-carboxylic acid

A suspension of 6 g. (20.3 mmoles) of 3-phenacyl-2-oxoindoline-7-carboxylic acid in 50 ml. of glacial acetic acid is heated and stirred while 3 ml. of 100% hydrazine hydrate is added. The mixture is heated to near boiling and stirred for 2 hours, diluted with water, cooled, and filtered. The recovered precipitate is recrystallized from dimethylformamide-water to give the title product, M.P. 282–284°.

EXAMPLE 14

Use of 3 - phenacyl - 2-oxoindoline-7-carboxylic acid methyl ester, 3-(m-fluorophenacyl)-2-oxoindoline-7-carboxylic acid, 3-(p-fluorophenacyl)-2-oxoindoline-7-carboxylic acid, or 3-(m-trifluoromethylphenacyl)-2-oxoindoline-7-carboxylic acid as starting material in the proceduce of Example 13 results in the formation of 3-phenyl-9H - pyridazino[3,4-b]indole - 8-carboxylic acid methyl ester, 3 - (m - fluorophenyl)-9H-pyridazino[3,4-b]indole-8-carboxylic acid, 3-p-fluorophenyl)-9H-pyridazino[3,4-b] indole-8-carboxylic acid, or 3-(m-trifluoromethylphenyl)-9H-pyridazino[3,4-b]indole-8-carboxylic acid, respectively.

EXAMPLE 15

3-hydroxy-2-oxoindoline-7-carboxylic acid

A suspension of 19.0 g. of 2,3-dioxoindoline-7-carboxylic acid in 200 ml. of hot water is stirred and heated to boiling while 34 g. of $Na_2S_2O_4$ is added in portions. The mixture is boiled for 20 minutes, cooled, and then continuously extracted with ether for 3 days. Evaporation of the ether and recrystallization of the residue from methanol gives the title product, M.P. 203–207°.

Use of the methyl ester of the above starting material results in the formation of the methyl ester of the product.

EXAMPLE 16

2-oxoindoline-7-carboxylic acid

A solution of 3.0 g. (15.5 mmoles) of 3-hydroxy-2-oxoindoline-7-carboxylic acid in 30 ml. of water containing 2.0 g. (23.8 mmoles) of $NaHCO_3$ is stirred at 0° while a stream of $CO_2$ is bubbled in, and 10 g. of Na-Pb (9.6% Na; 0.96 g. of Na, 42 mmoles) is added in several portions over a 2 hour period. After about 3 hours, when thin layer chromatography indicates the reaction to be complete, the mixture is filtered, the filtrate acidified, and the resulting precipitate collected. Recrystallization from methanol gives the title product, M.P. 244–246°.

Use of the methyl ester gives the corresponding ester product.

EXAMPLE 17

When the following acetophenones are used as starting materials in the procedure of Example 2 in place of acetophenone, the corresponding listed 3-hydroxy-3-phenacyl compounds are obtained.

| Acetophenone: | 3-hydroxy compound |
|---|---|
| o-Chloroacetophenone | 3-hydroxy-3-(o-chlorophenacyl)-2-oxoindoline-7-carboxylic acid. |
| m-Bromoacetophenone | 3-hydroxy-3-(m-bromophenacyl)-2-oxoindoline-7-carboxylic acid. |
| p-Methylacetophenone | 3-hydroxy-3-(p-methylphenacyl)-2-oxoindoline-7-carboxylic acid. |
| o-Butylacetophenone | 3-hydroxy-3-(o-butylphenacyl)-2-oxoindoline-7-carboxylic acid. |
| p-Ethoxyacetophenone | 3-hydroxy-3-(p-ethoxyphenacyl)-2-oxoindoline-7-carboxylic acid. |

When the above listed 3-hydroxy-3-phenacyl compounds are dehydrated according to the procedure of Example 7, the following 3-phenacylidene compounds are obtained, respectively.

3-(o-chlorophenacylidene)-2-oxoindoline-7-carboxylic acid
3-(m-bromophenacylidene)-2-oxoindoline-7-carboxylic acid
3-(p-methylphenacylidene)-2-oxoindoline-7-carboxylic acid
3-(o-butylphenacylidene)-2-oxoindoline-7-carboxylic acid
3-(p-ethoxyphenacylidene)-2-oxoindoline-7-carboxylic acid When the above listed 3-phenacylidene compounds are reduced with $Na_2S_2O_4$ according to the procedure of Example 11, the following 3-phenacyl compounds are obtained, respectively.

3-(o-chlorophenacyl)-2-oxoindoline-7-carboxylic acid
3-(m-bromophenacyl)-2-oxoindoline-7-carboxylic acid
3-(p-methylphenacyl(-2-oxoindoline-7-carboxylic acid
3-(o-butylphenacyl)-2-oxoindoline-7-carboxylic acid
3-(p-ethoxyphenacyl)-2-oxoindoline-7-carboxylic acid When the above listed 3-phenacyl compounds are condensed with hydrazine hydrate according to the procedure of Example 13, the following pyridazinoindolecarboxylic acids are obtained, respectively.

3-(o-chlorophenyl)-9H-pyridazino[3,4-b]indole-8-carboxylic acid
3-(m-bromophenyl)-9H-pyridazino[3,4-b]indole-8-carboxylic acid
3-(p-tolyl)-9H-pyridazino[3,4-b]indole-8-carboxylic acid
3-(o-butylphenyl)-9H-pyridazino[3,4-b]indole-8-carboxylic acid
3-(p-ethoxyphenyl)-9H-pyridazino[3,4-b]indole-8-carboxylic acid Esterification of any of the above carboxylic acid products with methanol, ethanol, propanol, or butanol, using acid catalysis with hydrogen chloride or sulfuric acid, results in the formation of the corresponding methyl, ethyl, propyl, or butyl ester.

When the above pyridazinoinodole carboxylic acids or esters are dissolved or suspended in anhydrous alcohols, acetone, or ether, and hydrogen chloride, maleic acid, or a similar pharmaceutically acceptable acid added, as such or as an ethereal, acetone, or alcoholic solution, the corresponding salt is obtained.

Alkali metal salts such as sodium or potassium, or amine salts such as the ammonium, triethylammonium salts, etc. are prepared by treating a free acid compound in solution with the alkali metal hydroxide, bicarbonate, or carbonate, or with ammonia, triethylamine, or other amine.

I claim:
1. A compound of the formula

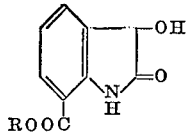

wherein R is hydrogen or lower alkyl.

2. A compound as claimed in claim 1, being the compound 3-hydroxy-2-oxoindoline-7-carboxylic acid.

3. A compound of the formula

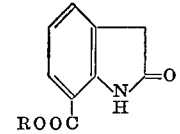

wherein R is hydrogen or lower alkyl.

4. A compound as claimed in claim 3, being the compound 2-oxoindoline-7-carboxylic acid.

References Cited

UNITED STATES PATENTS 2,872,372  2/1959  Hull _____ 260—240 X

ALEX MAZEL, Primary Examiner

JOSEPH A. NARCAVAGE, Assistant Examiner

U.S. Cl. X.R.

260—240 D, 250 A; 424—274